(12) United States Patent     (10) Patent No.:     US 12,608,183 B2
Antao                            (45) Date of Patent:        Apr. 21, 2026

(54) METHOD FOR AUTOMATED SOFTWARE DEPENDENCY ADAPTATION

(71) Applicant: T-Mobile Innovations LLC, Overland Park, KS (US)

(72) Inventor: Jawahar Antao, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 266 days.

(21) Appl. No.: 18/462,343

(22) Filed: Sep. 6, 2023

(65) Prior Publication Data

US 2025/0077202 A1      Mar. 6, 2025

(51) Int. Cl.
G06F 8/41          (2018.01)
G06F 8/71          (2018.01)
G06F 11/3668       (2025.01)

(52) U.S. Cl.
CPC ............... G06F 8/433 (2013.01); G06F 8/71 (2013.01); G06F 11/3688 (2013.01)

(58) Field of Classification Search
CPC ........ G06F 8/433; G06F 8/71; G06F 11/3688; G06F 11/3692; G06F 11/3698
See application file for complete search history.

(56)                References Cited

U.S. PATENT DOCUMENTS

| | | | | |
|---|---|---|---|---|
| 9,170,915 | B1* | 10/2015 | Fateev | G06F 9/5038 |
| 2009/0217244 | A1* | 8/2009 | Bozak | G06F 8/65 |
| | | | | 717/124 |
| 2012/0090021 | A1* | 4/2012 | Luh | G06F 9/468 |
| | | | | 726/17 |
| 2014/0344391 | A1* | 11/2014 | Varney | H04L 65/612 |
| | | | | 709/213 |
| 2017/0083430 | A1* | 3/2017 | Meerovich | G06F 8/00 |
| 2019/0114165 | A1* | 4/2019 | Ghiondea | G06F 8/71 |
| 2019/0205112 | A1* | 7/2019 | Salameh | G06F 8/65 |
| 2020/0125485 | A1* | 4/2020 | Wiener | G06F 11/3698 |
| 2022/0156053 | A1* | 5/2022 | Shaastry | G06F 8/433 |
| 2025/0021438 | A1* | 1/2025 | Bérat | G06F 11/3692 |

* cited by examiner

*Primary Examiner* — Wei Y Mui
*Assistant Examiner* — Travis Viet Tran

(57)               ABSTRACT
A method is provided for adapting, in a server, application software executing on the server to a change in a dependency software component. The server receives a software bundle with application software, source code of the application software, testing software with test scripts and self-adaptation software. The self-adaptation software obtains a changed dependency component and rebuilds the application software with the changed dependency. If the rebuild was unsuccessful, it sends a rebuild failure message to a user. If the rebuild was successful, the testing software tests the rebuilt application. If the testing was unsuccessful, it sends a testing failure message to a user. If the rebuild was successful, the self-adaptation software loads the rebuilt application software, stops execution of the application software, and begins execution of the rebuilt application software.

18 Claims, 5 Drawing Sheets

500 →

500

METHOD FOR AUTOMATED SOFTWARE DEPENDENCY ADAPTATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Application software often utilizes other pieces of software in its execution. Such other pieces of software may be referred to as "dependencies" of the application software, as the application software depends on the other software in its execution. Some dependencies may be software libraries or other source code that become part of the application software when it is built. Other dependencies may be software that the application software calls during execution, such as database management systems, frameworks, or application programming interfaces (APIs). Because dependencies are often provided by programmers other than those developing the application software, dependencies' revisions are released independently of the development and deployment timeline of the application software. Because the application software utilizes the dependencies, changes introduced in such dependency revisions may affect operation of the application software.

SUMMARY

In an embodiment, a method for adapting, in a server computer, application software to a change in a dependency software component is disclosed, where the application software is executing on the server computer. The method comprises receiving by the server computer a software bundle that comprises application software configured to execute on the server computer; source code of the application software; testing software comprising test scripts and configured to cause the server computer to test the application software using the test scripts; and self-adaptation software configured to execute on the server computer. The method further comprises executing by the server computer the application software; and executing by the server computer the self-adaptation software. The self-adaptation software is configured to cause the server computer to: obtain by the server computer information identifying a changed dependency component, where a dependency component comprises a software component that the application software uses during execution; obtain by the server computer the changed dependency component, based on the information identifying the changed dependency component; generate by the server computer rebuilt application software by rebuilding source code of the application software using the changed dependency component; and determine by the server computer whether the rebuilt application software was successfully generated. If the rebuilt application software was not successfully generated, send by the server computer a rebuild failure message to a user of the server computer. If the rebuilding of the application software was successful: test by the server computer the rebuilt application software using the testing software; and determine by the server computer whether testing of the rebuilt application software was successful. If the testing of the rebuilt application software was not successful, send by the server computer a testing failure message to the user of the server computer. If the testing of the rebuilt application software was successful: load by the server computer the rebuilt application software; stop execution by the server computer of the application software; and begin execution by the server computer of the rebuilt application software.

In another embodiment, a method for adapting, in a first server computer, application software to a change in a dependency software component, where the application software executing on a second server computer. The method comprises: obtaining by the first server computer information identifying a changed dependency component, where a dependency component comprises a software component that the application software uses during execution; obtaining by the first server computer the changed dependency component, based on the information identifying the changed dependency component; generating by the first server computer rebuilt application software by rebuilding source code of the application software using the changed dependency component; and determining by the first server computer whether the rebuilt application software was successfully generated. If the rebuilt application software was not successfully generated, sending by the first server computer a rebuild failure message to a user of the first server computer. If the rebuilt application software was successfully generated: testing by the first server computer the rebuilt application software; and determining by the first server computer whether testing of the rebuilt application software was successful. If the testing of the rebuilt application software was not successful, sending by the first server computer a testing failure message to the user of the first server computer. If the testing of the rebuilt application software was successful, sending by the first server computer one or more messages configured to cause initiation of execution of the rebuilt application software.

In yet another embodiment, a method for adapting, in a first server computer, application software to a change in a dependency software component, where the application software is executing on a second server computer. The method comprises: obtaining by the first server computer information identifying a changed dependency component, where a dependency component comprises a software component that the application software uses during execution; obtaining by the first server computer the changed dependency component, based on the information identifying the changed dependency component; and entering a first loop for generating rebuilt application software. The first loop comprises: generating by the first server computer the rebuilt application software by rebuilding source code of the application software using the changed dependency component; determining by the first server computer whether the rebuilt application software was successfully generated; exiting the first loop if the rebuilt application software was successfully generated; requesting by the first server computer rewritten source code from a user of the first server computer if the rebuilt application software was not successfully generated; receiving by the first server computer the rewritten source code from the user of the first server computer; and replacing by the first server computer the source code of the application software with the rewritten source code. The method further comprises entering a second loop for testing the rebuilt application software, the second loop comprising: testing by the first server computer the rebuilt application software; determining by the first server computer whether testing of the rebuilt application software was successful; exiting the second loop if the testing of the rebuilt application software was successful; requesting by the first server computer rewritten source code from the user of the first server computer if the testing of the rebuilt application software was not successful; receiving by the first server computer the rewritten source code from the user of the first server computer; replacing by the first server computer the source code of the application software with the rewritten source code; and exiting the second loop and restarting the first loop. The method further comprises sending by the first server computer one or more messages configured to cause initiation of execution of the tested rebuilt application software.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
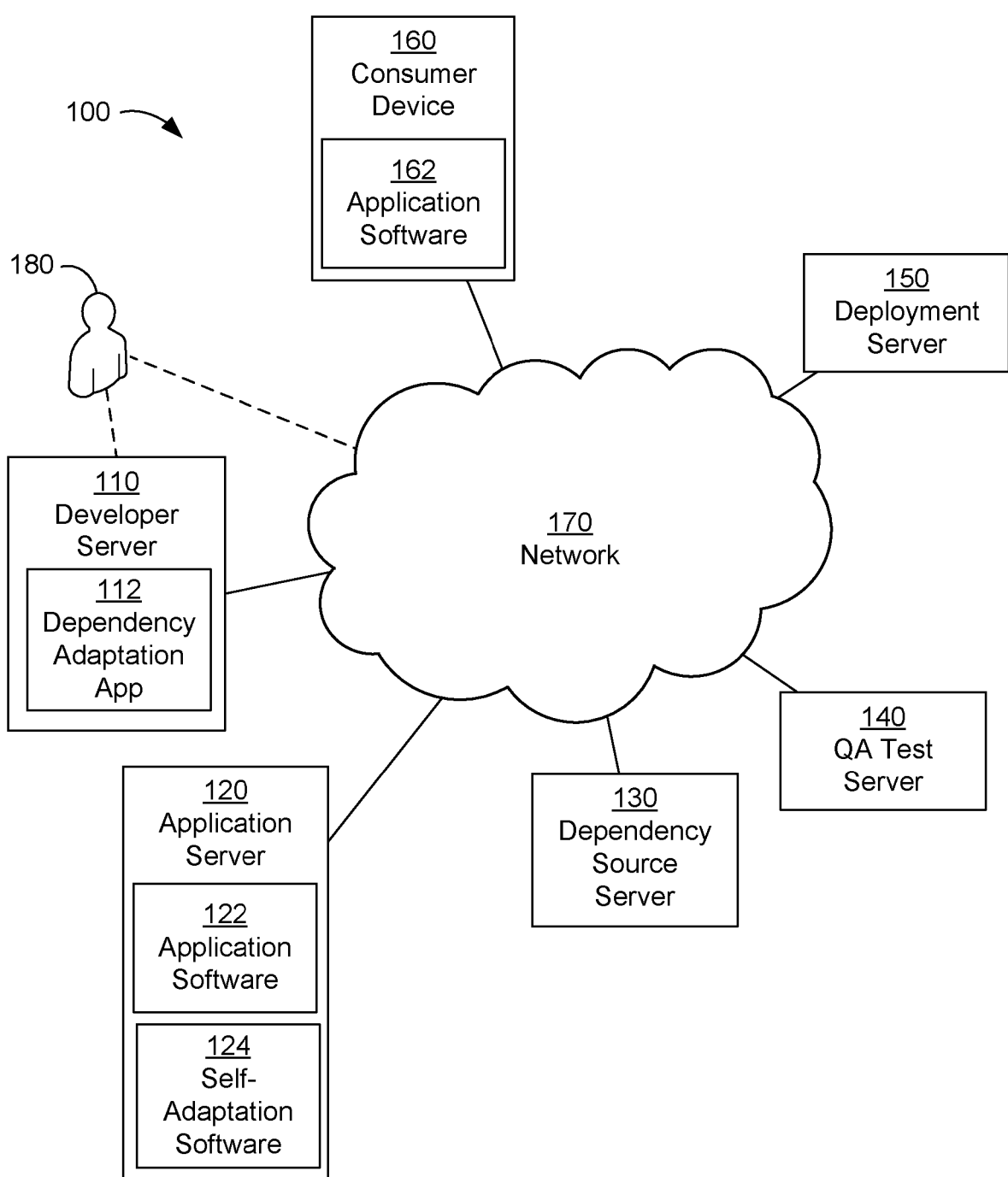
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In one example, application software executing on a server computer (or, simply, server) may provide an Internet portal to allow customer access to their billing or inventory information and to enable them to create, view, share, and delete reports on the information. Such functionality is provided by a secure application that should include or make calls to the latest versions of its dependencies as they are changed by security updates.

Such application software is supported by an application developer that often comprises a number of process groups. There may be a first group that monitors security deficiency reports that identify one or more dependencies with security problems—i.e., dependencies that may have been changed or should be changed. In some cases, dependencies are changed without notice of the change being sent to application developers. A time lag may occur between security problem in the dependency being identified, the dependency being updated, and security notices being sent out. A programming group may evaluate the changed dependencies to determine whether they are likely to require changes to the application source code and, if so, to make those changes. Once the source code changes have been made and rebuilt, a quality assurance (QA) group may test the rebuilt software. Such testing may be limited to tests that are selected based on the dependencies that have changed. Finally, once the rebuilt software has been tested it is passed to a deployment group that approves the revised application for distribution to servers where the application is executing. As a result, the developer's process is lengthy and resource intensive.

Changes to some dependencies may be provided using patches or other modifications, which are tested by the dependency developer. However, despite such testing, in some cases the dependency may be changed in a way that causes the application software to fail unexpectedly to rebuild properly using the patched dependency. In other cases, functionality of the application software may change (or the application software may fail) when calling the changed dependency during execution. When an application software developer receives security deficiency reports that identify one or more dependencies with security problems, the developer must determine whether such dependencies are used in the application software, determine whether the dependencies have been changed, and determine whether the changes cause problems in the rebuilding or functioning of the application software.

As such, the application software developer faces several technical problems in generating a new version of application software when dependencies change. The developer may not learn about the potential deficiency in the dependency until receiving the security deficiency report, and only then is prompted to go to the dependency developer's website to find whether the dependency has been updated. The developer may not learn about a change in a dependency through a security deficiency report, and instead discover the change independently by going to the dependency developer's website to check for an update. If the dependency has been updated, the developer may review the change log of the update to decide whether to rewrite the application software source code to adapt to the change. Whether the application software source code is rewritten or not, the developer rebuilds the application software with the changed dependency to determine whether the rebuilding is successful. Once the application software rebuilds successfully, the developer sends the application software to a Quality Assurance (QA) team for testing. The QA team may test only the elements of the application associated with the changed dependencies. If testing of the application software is unsuccessful, the application software source code is rewritten, rebuilt, and retested until testing is successful. The rewrite, rebuild, and retest cycle may be repeated several times. Once testing is successful, the rebuilt application software is released for deployment to replace the current version that is in use.

Additionally, it may occur that several dependencies happen to be changed at the same time. In such a situation, in order to make it easier to determine which dependency (if any) causes problems in building and/or testing the application software, the developer may choose to incorporate one changed dependency at a time, rather than change them all at once. In such situations, the rewriting, rebuilding, and retesting cycle will be repeated for each dependency as it is incorporated into the application software.

Methods according to the disclosure for adapting application software to changes in dependency software components provide a trusted system that includes several technical solutions to these technical problems. To solve the problem of waiting on security deficiency reports to learn of possible dependency changes, methods according to the disclosure are notified of (or independently check on) dependency changes. To solve the problem of identifying dependencies whose changes may prompt rebuilding and retesting of application software, methods according to the disclosure identify a need to rebuild and retest based on a dependency descriptor that includes information on current dependencies of the software application.

To solve the problem that significant complexity and demands on developers' resources arise in adapting to changes in dependencies, methods according to the disclosure combine many of the steps of rebuilding, retesting (using prewritten test scripts), and deployment (if authorized or enabled by a provider of the software application). Methods according to the disclosure notify the developer (e.g., by throwing an exception) only if automated rebuilding or QA testing fails. Some such methods request rewritten source code from the developer if automated rebuilding or QA testing fails, maintain the status of their process through the method, and resume the method with rebuilding application software upon receiving the rewritten source code.

Where application software is used on a large number of server computers, differences in execution environment may exist between various such server computers. Where an application developer generates rebuilt application software at a centralized facility, the developer faces the problem of testing rebuilt application software in each of these different execution environments. Methods according to the disclosure solve this problem by distributing an application software bundle that includes: (i) built and tested application software to execute on a server computer, (ii) source code for the application software, (iii) testing software, and (iv) self-adaptation software configured to implement methods according to the disclosure. Such embodiments permit servers that are executing the application software to self-adapt to changed dependencies by executing the self-adaptation software and executing the testing software. In such embodiments, the work of adapting to changed dependencies is spread over multiple server computers, rather than centralized in the developer's server(s).

Where an application software developer has developed multiple applications, several of those applications may use the same dependency software component. In such circumstances, the developer faces the problem of rebuilding and testing multiple applications in response to a single dependency change-which consumes a large amount of time and/or computing power if performed centrally. Self-adaptation software according to the disclosure solve this problem by enabling the various server computers executing the developer's various applications to self-adapt independently.

Turning now to FIG. 1, a communication system 100 according to the disclosure is described. In an embodiment, the system 100 comprises a developer server computer 110, an application server 120, a dependency source server 130, a QA test server 140, and a deployment server 150. These elements of the system 100 are coupled to and communicate wired or wirelessly via a network 170. The network 170 may be one or more public networks, one or more private networks, or a combination thereof.

Functions described herein as performed by individual ones of the server computers of the communication system 100 may be performed by other servers. A single server may perform multiple functions. Not all of the servers of system 100 may be used in some embodiments of the disclosure.

In some embodiments, the communication system 100 further includes a consumer device 160, such as a smart doorbell or voice-controlled virtual assistant, which also communicates wired or wirelessly with other elements of the system 100 via the network 170. In various embodiments, a user 180 of the system 100 may communicate directly with any of the servers, via another of the servers, or wired or wirelessly via the network 170 using a laptop, tablet, desktop, or other network-enabled device.

The developer server computer 110 includes a dependency adaptation application (or function) 112 according to the disclosure, as discussed below with reference to FIG. 2, which may be used by a developer to adapt application software to changes in one or more dependency software components. The application server 120 includes application software (or function software) 122 and, in some embodiments, self-adaptation software 124, which may adapt the application software 122 executing on another server computer to a change in one or more dependency software components. The consumer device 160 includes application software 162.

The dependency source server 130 may be provided by a developer of software component(s) that the application software 122 uses during execution. Because the application software 122 may use a plurality of software components that are developed by different developers, there may be a plurality of dependency source servers 130 coupled to the network 170. The QA test server 140 may be used, in some embodiments, by a QA team for testing rebuilt application software prior to its deployment to, for example, the application server 120 as the application software 122. The deployment server 150 may be used, in some embodiments, by a deployment team for distributing rebuilt application software to, for example, the application server 120 as the application software 122, and initiating use of the rebuilt application software.

As discussed above, in one example, the application software 122 may provide an Internet portal to allow customer access to billing or inventory information and to enable them to create, view, share, and delete reports on the information. Because such functionality should be provided by a secure application, the application software 122 is adapted by the dependency adaptation application 112 or the self-adaptation software 124 to include or make calls to the latest versions of its dependencies as they are changed by security and other updates.

The discussion above relates to adapting the application software 122 to changes in dependency software components. However, methods according to embodiments of the disclosure may also be used to adapt the application software 162 in the consumer device 160. As the consumer device 160 is a network-connected device, the application software 162 may be embedded software that is downloaded once it is tested and released for deployment.

Figure 2:
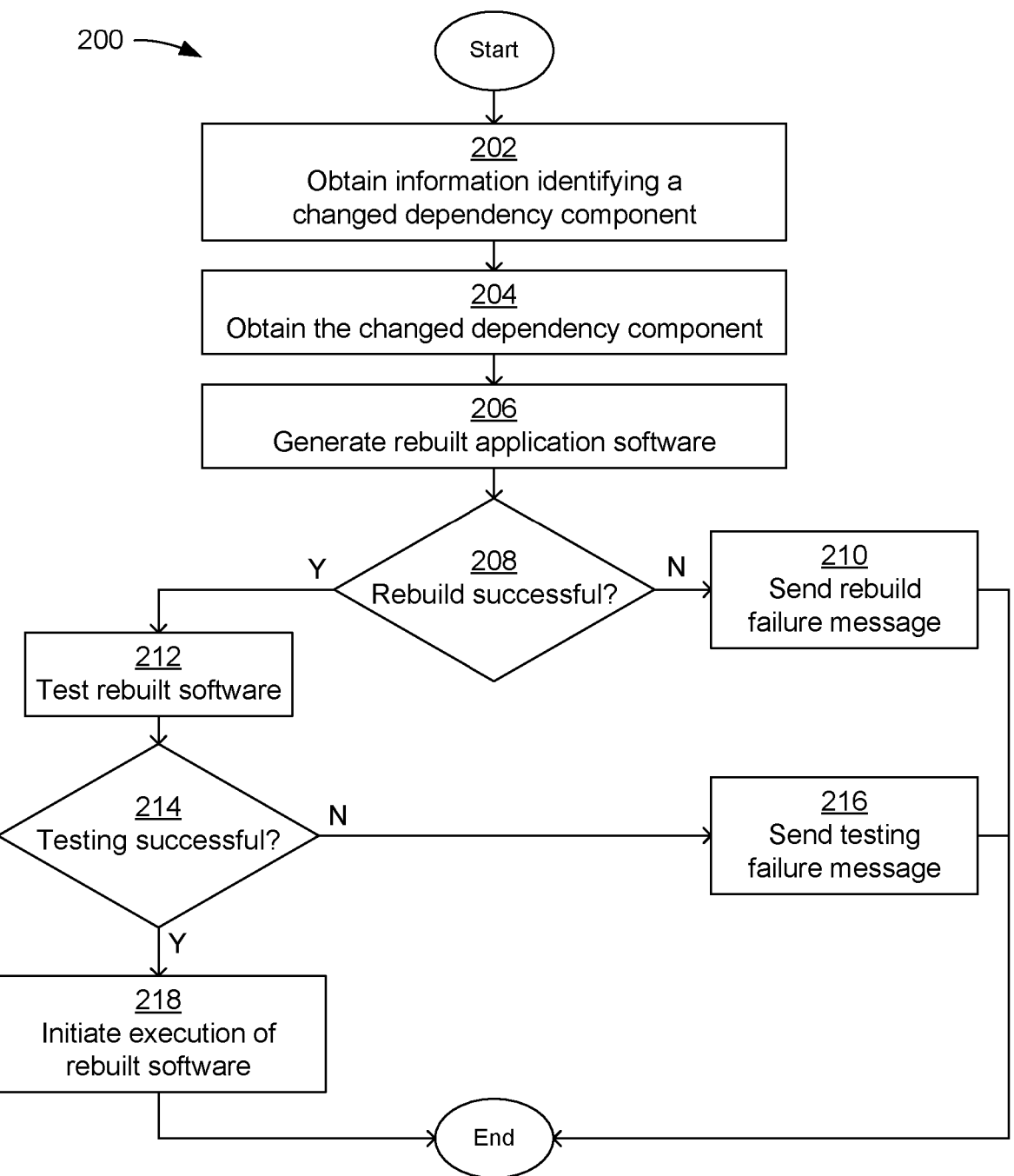
FIG. 2 is a flow chart of a first method according to an embodiment of the disclosure.

FIG. 2 is a flow chart of a first method 200 according to an embodiment of the disclosure. The method 200 illustrates processes that may be implemented within the dependency adaptation application 112 or the self-adaptation software 124. The method is illustrated as a logical flow graph, each operation of which represents a sequence of operations that can be implemented in hardware, software, or a combination thereof.

For clarity of description, the method 200 is described as though executed by the dependency adaptation application 112 executing on the developer server 110 to adapt the application software 122 executing on the application server 120. However, the description of the method 200 also applies to adapting the application software 162 executing on the consumer device 160. The description of the method 200 further applies to adapting the self-adaptation software 124 executing on the application server 120 to adapt the application software 122.

In step 202, the dependency adaptation application 112 obtains information that identifies one or more changed dependency components. In some embodiments, step 202 includes obtaining a dependency descriptor that includes information identifying a plurality of dependency components of the application software 122. The dependency descriptor may include information identifying all of the dependency components of the application software 122. In various embodiments, the dependency descriptor is read from memory of the developer server 110, the QA test server 140, or another server coupled to the network 170. The dependency descriptor further includes, for each of the dependency components, the dependency source server 130 that is associated with the dependency component and information identifying a version of the dependency component that was in use when the application software was last built.

In some embodiments, the dependency adaptation application 112 iterates through the dependency descriptor's information for dependency components and obtains from the dependency source server 130 associated with the dependency component information identifying a current version of the dependency component. The dependency adaptation application 112 then compares the current version of the dependency component to the version that was in use when the application software was last built. If the comparison indicates that the current version is more recent than the in-use version, the dependency adaptation application 112 identifies the dependency component as a changed dependency component.

In other embodiments, for some or all dependency components, the dependency adaptation application 112 subscribes to a system that sends a change notification message when a dependency developer has changed or updated a dependency component. In some embodiments, the change notification message includes information identifying the current version of the dependency component. In other embodiments, the change notification message identifies the dependency component that has changed, and the dependency adaptation application 112 obtains from the dependency component's associated dependency source server 130 the information that identifies the current version of the dependency component.

The method 200 remains in step 202 until information identifying a changed dependency component is obtained. In some embodiments, that information is obtained when information indicating that the current version of a dependency component is more recent than the in-use version. In other embodiments, that information is obtained when a change notification message identifying a changed dependency component is received. Once information identifying a changed dependency component is obtained in step 202, the method 200 proceeds to step 204.

In step 204, the dependency adaptation application 112 obtains the changed dependency component from the changed dependency component's associated dependency source server 130. In step 206, the dependency adaptation application 112 generates rebuilt application software by rebuilding source code of the application software 122 using the changed dependency component. In embodiments that include the dependency descriptor, prior to generating the rebuilt application software, the dependency adaptation application 112 stores a copy of the current value of the dependency descriptor and updates the dependency descriptor with the current version information of the changed dependency component.

In step 208, the dependency adaptation application 112 determines whether the rebuilt application software was successfully generated. If the rebuilt application software was not successfully generated, in step 210, the dependency adaptation application 112 sends a rebuild failure message to the user 180 of the developer server computer 110 and the method 200 terminates.

If the rebuilt application software was successfully generated, in step 212 the dependency adaptation application 112 tests the rebuilt application software. In some embodiments, the testing is performed by the developer server computer 110. In other embodiments, the rebuilt application software is sent via a testing initiation message to the QA test server computer 140, the testing is performed by the QA test server computer 140, and information relating to the results of the testing is sent from the QA test server computer 140 to the developer server computer 110. In some embodiments, information relating to the results of the testing is sent from the developer server computer 110 or the QA test server computer 140 to the user 180 for a determination of whether testing of the rebuilt application software was successful.

In step 214, the dependency adaptation application 112 determines whether testing of the rebuilt application software was successful. If the rebuilt application software was not successfully tested, in step 216, the dependency adaptation application 112 sends a testing failure message to the user 180 of the developer server computer 110 and the method 200 terminates.

If the testing of the rebuilt application software was successful, in step 218 the dependency adaptation application 112 causes initiation of execution (or deployment) of the rebuilt application software by sending one or more messages and the method 200 terminates. In some embodiments, the one or more messages are configured to cause initiation of execution of the rebuilt application software at a predetermined time or in response to an identified event. One example of such an event would be receipt of a second message that indicates copies of the rebuilt application software have been successfully deployed to multiple server computers and may begin execution on all the server computers in a coordinated fashion.

In various organizations, deployment may be overseen by a team that coordinates introduction of the rebuilt application software with other corporate functions, e.g., service and/or sales and marketing. In such embodiments, the dependency adaptation application 112 sends the one or more messages to the deployment server 150. The messages may include the rebuilt application software and are configured to cause a deployment team to begin the process of deploying and initiating use the rebuilt application software.

In other organizations, deployment may be authorized to occur automatically, as soon as successful testing is complete. In other embodiments, the one or more messages are sent by the dependency adaptation application 112 to the application server 120. The messages include the rebuilt application software and are configured to cause the application server 120 to initiate execution of the rebuilt application software by loading the rebuilt application software, stopping execution of the application software, and initiating execution of the rebuilt application software.

In applications where the method 200 is performed by the self-adaptation software 124 executing on the application server 120, the messages to cause the rebuilt application software to be deployed may be sent to the operating system of the application server 120. The messages cause the operating system to load the rebuilt application software into memory of the application server 120, stop executing the application software 122, and begin executing of the rebuilt application software.

Figure 3:
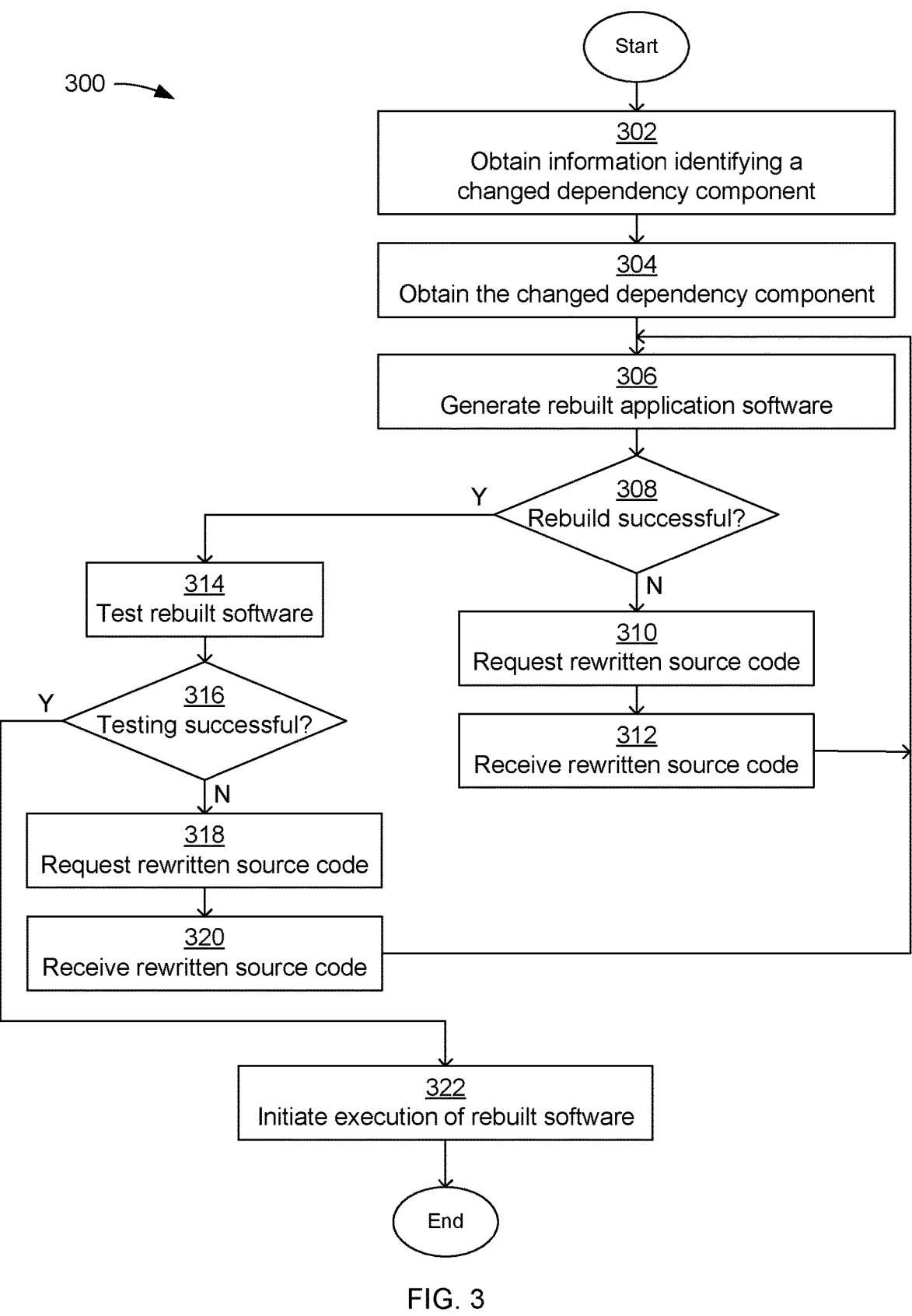
FIG. 3 is a flow chart of a second method according to an embodiment of the disclosure.

FIG. 3 is a flow chart of a second method 300 according to an embodiment of the disclosure. The method illustrates processes that may be implemented within the dependency adaptation application 112 or the self-adaptation software 124. The method is illustrated as a logical flow graph, each operation of which represents a sequence of operations that can be implemented in hardware, software, or a combination thereof.

Where the method 200 responds to a failure in rebuilding or testing rebuilt application software by sending a failure message to the user 180 and terminating the method 200, the method 300 responds differently to such failures. When rebuilding or testing the rebuilt application software fails, the method 300 sends a request to the user 180 for rewritten source code and may include diagnostic information about the failure. Once the developer rewrites the source code to adapt to the changed dependency component(s), the developer sends the rewritten source code to the method 300, which generates rebuilt application software using the rewritten source code. If the rebuilt application software was successfully generated, the method 300 proceeds to test the rebuilt application software, as discussed in more detail below.

For clarity of description, the method 300 is described as though executed by the self-adaptation software 124 executing on the application server 120 to adapt the application software 122 executing on the application server 120. However, the description of the method 300 also applies to the dependency adaptation application 112 executing on the developer server 110 to adapt the application software 122.

In step 302, the self-adaptation software 124 obtains information that identifies one or more changed dependency components. In some embodiments, step 302 includes obtaining a dependency descriptor, as discussed with reference to the method 200, that includes information identifying a plurality of dependency components of the application software 122. As discussed above with reference to the method 200, in some embodiments the self-adaptation software 124 iterates through the dependency source servers 130 of the dependency components to identify a changed dependency component. In other embodiments, the self-adaptation software 124 receives a change notification message identifying a changed dependency component. As discussed above with reference to the method 200, the method 300 remains in step 302 until information identifying a changed dependency component is obtained.

In step 304, the self-adaptation software 124 obtains the changed dependency component from the changed dependency component's associated dependency source server 130. In step 306, the self-adaptation software 124 generates rebuilt application software by rebuilding source code of the application software 122 using the changed dependency component. As discussed above, in some embodiments the self-adaptation software 124 stores a copy of the current value of the dependency descriptor and updates the dependency descriptor with the current version information of the changed dependency component prior to generating the rebuilt application software.

In step 308, the self-adaptation software 124 determines whether the rebuilt application software was successfully generated. If the rebuilt application software was not successfully generated, in step 310, the self-adaptation software 124 sends a message to the user 180 of the developer server computer 110 requesting rewritten source code of the application software 122. The message may include an error log or other failure information relating to the failure to successfully generate the rebuilt application software. In step 312, the self-adaptation software 124 receives the requested rewritten source code and loops back to step 306 to generate rebuilt application software using the rewritten source code.

If the rebuilt application software was successfully generated, in step 314 the self-adaptation software 124 tests the rebuilt application software. As discussed above, in various embodiments the testing may be performed locally by the application server 120 or sent in a testing initiation message to another server computer, such as the QA test server computer 140, for testing. As also discussed above, information relating to the results of the testing may be sent to the user 180 for a determination of whether testing of the rebuilt application software was successful.

As discussed above, testing of the rebuilt application software (whether performed by the developer server computer 110 or the QA test server computer 140) may include unit tests, functional tests, and integration tests. In various embodiments, the rebuilt application software is tested using one or more test scripts with associated parameters.

In step 316, the self-adaptation software 124 determines whether testing of the rebuilt application software was successful. If the rebuilt application software was not successfully tested, in step 318, the self-adaptation software 124 sends a message (which may include failure information relating to the testing failure) to the user 180 of the developer server computer 110 requesting rewritten source code of the application software 122. In step 320, the self-adaptation software 124 receives the requested rewritten source code and loops back to step 306 to generate rebuilt application software using the rewritten source code.

If the testing of the rebuilt application software was successful, in step 322 the self-adaptation software 124 causes initiation of execution (or deployment) of the rebuilt application software by sending one or more messages and the method 300 terminates. As discussed above, the messages may be configured to cause execution of the rebuilt application software at a predetermined time or in response to an identified event. The messages may be sent to the operating system of the application server 120 to cause the operating system to initiate execution of the rebuilt application software, as discussed above. In some embodiments, the rebuilt and tested application software may be sent to the developer server 110 for storage.

Figure 4:
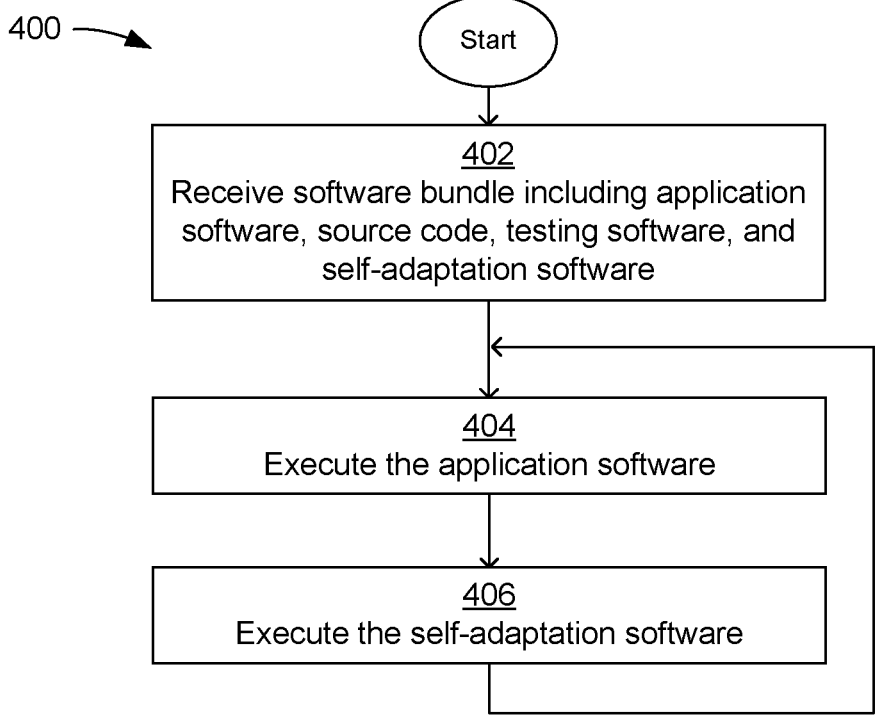
FIG. 4 is a flow chart of a third method according to an embodiment of the disclosure.

FIG. 4 a flow chart of a third method 400 according to an embodiment of the disclosure is described. The method illustrates a process that may be implemented within the application server 120. The method is illustrated as a logical flow graph, each operation of which represents a sequence of operations that can be implemented in hardware, software, or a combination thereof.

In step 402, the application server 120 receives a software bundle that includes the application software 122, source code of the application software 122, testing software that includes test scripts and other information for testing the application software 122 when it is rebuilt, and the self-adaptation software 124. In step 404, the application server 120 begins execution of the application software 122.

In step 406, the application server 120 begins execution of the self-adaptation software 124, while continuing to execute the application software 122. In various embodiments, the self-adaptation software 124 may comprise the method 200 of FIG. 2 or the method 300 of FIG. 3. In either such embodiment, if the self-adaptation software 124 successfully rebuilds and tests rebuilt application software, the application server 120 returns to step 404 to begin executing the rebuilt application software and restart the self-adaptation software 124 in step 406. If executing the method 200, upon failure in either rebuilding or testing the rebuilt application software, the application server 120 returns to step 404 to continue executing the application software 122 and restart the self-adaptation software 124 in step 406. If executing the method 300, the application server 120 remains in the method 300 (while execution of the application software 122 continues) until rebuilt application software is successfully rebuilt and tested, whereupon the application server 120 returns to step 404 to begin executing the rebuilt application software and restart the self-adaptation software 124 in step 406.

Tests of the rebuilt application software (whether performed by the developer server computer 110, the QA test server computer 140, or the testing software discussed with reference to step 402) may include unit tests, functional tests, and integration tests. When tests of the rebuilt application software are run, methods according to the disclosure store a test record that includes a version number of the rebuilt application software tested, information that identifies the test scripts that were used in testing the rebuilt application software, and the parameters that were used by the tests.

Unit tests test individual modules of an application for correct operation on its own, without interaction with other modules. In one example, a module implements a data structure that receives and stores blocks of information (in the example, a data structure for storing descriptions of items that a user places in a shopping cart of a shopping application). In some embodiments, a test script for a unit test of such a module may utilize associated parameters such as blocks of information to be stored by the module and resulting data structures with the blocks correctly stored.

Functional tests test whether a plurality of modules and their dependencies function correctly together. In the example, a plurality of modules implements shopping cart functionality. In some embodiments, a test script for a functional test of such a plurality of modules may utilize associated parameters such as one or more sample items to be placed in the shopping cart and an expected result value for a query to the shopping cart of its current items.

Integration tests test whether the modules and dependencies of an application function correctly together. In one example, a shopping application provides a user interface for the actions of finding items to purchase, determining their availability, enabling a user to put items in the previously tested shopping cart, and providing a checkout process for the user. In some embodiments, a test script for a integration test of such an application may utilize associated parameters such as user interface inputs for the above actions (both allowed and disallowed actions) and expected responses or outputs by the application.

Figure 5:
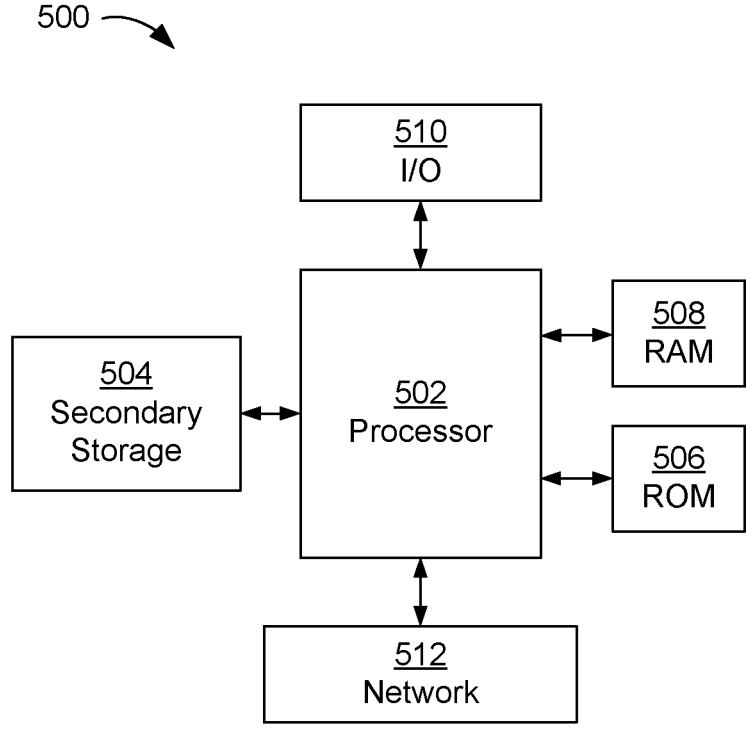
FIG. 5 is a block diagram of a hardware architecture of a device according to an embodiment of the disclosure.

FIG. 5 is a block diagram of a hardware architecture of a server computer 500 according to an embodiment of the disclosure. The server computer 500 may be suitable for implementing methods 200, 300, or 400. The server computer 500 includes a processor 502 (which may be referred to as a central processor unit or CPU) that is in communication with memory devices including secondary storage 504, ROM 506, and RAM 508. The processor 502 is also in communication with input/output (I/O) devices 510, and network connectivity devices 512. The processor 502 may be implemented as one or more CPU chips.

It is understood that by programming and/or loading executable instructions onto the server computer 500, at least one of the CPU 502, the RAM 508, and the ROM 506 are changed, transforming the server computer 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 may be faster than to secondary storage 504. The secondary storage 504, the RAM 508, and/or the ROM 506 may be referred to in some contexts as computer readable storage media and/or non-transitory computer readable media.

The processor 502 executes instructions, codes, computer programs, scripts which it accesses from the secondary storage 504, the ROM 506, or the RAM 508. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, the ROM 506, and/or the RAM 508 may be referred to in some contexts as non-transitory instructions and/or non-transitory information.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the server computer 500 is powered up and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for adapting, in a first server computer, application software to a change in a dependency software component, the application software executing on the first server computer, the method comprising:

receiving by the first server computer a software bundle comprising:

the application software configured to execute on the first server computer;

source code of the application software;

testing software comprising test scripts and configured to cause the first server computer to test the application software using the test scripts; and self-adaptation software configured to execute on the first server computer;

executing by the first server computer the application software; and executing by the first server computer the self-adaptation software, wherein the self-adaptation software is configured to cause the first server computer to:

obtain by the first server computer a dependency descriptor comprising information identifying a plurality of dependency software components of the application software and, for each of the dependency software components of the plurality of the dependency software components:

a second server computer associated with the dependency software component; and in-use version information identifying an in-use version of the dependency software component that was in use when the application software was last built and tested, wherein each of the dependency software components comprises a software component that the application software uses during execution;

for each of the dependency software components of the plurality of the dependency software components:

obtain by the first server computer current version information identifying a current version of the dependency software component from the second server computer associated with the dependency software component;

compare by the first server computer the current version information and the in-use version information to determine whether the current version is more recent than the in-use version; and if the current version is more recent than the in-use version, identify by the first server computer the dependency software component as a changed dependency software component;

obtain by the first server computer the changed dependency software component, based on the information identifying the changed dependency software component;

generate by the first server computer rebuilt application software by rebuilding the source code of the application software using the changed dependency software component;

determine by the first server computer whether the rebuilt application software was successfully generated;

if the rebuilt application software was not successfully generated, send by the first server computer a rebuild failure message to a user of the first server computer;

if the rebuilding of the application software was successful:

test by the first server computer the rebuilt application software using the testing software;

determine by the first server computer whether testing of the rebuilt application software was successful;

if the testing of the rebuilt application software was not successful, send by the first server computer a testing failure message to the user of the first server computer;

if the testing of the rebuilt application software was successful:

load by the first server computer the rebuilt application software;

stop execution by the first server computer of the application software; and begin execution by the first server computer of the rebuilt application software.

2. The method of claim 1, wherein the test scripts comprise scripts for unit tests, functional tests, and integration tests and associated parameters for the unit tests, the functional tests, and the integration tests.

3. The method of claim 2, wherein the testing software is configured to cause the first server computer, as part of testing the rebuilt application software, to store a test record comprising:

a version number of the rebuilt application software tested;

information identifying the test scripts used in testing the rebuilt application software; and the parameters used by the unit tests, the functional tests, and the integration tests in testing the rebuilt application software.

4. The method of claim 1, wherein the self-adaptation software is further configured to obtain by the first server computer information identifying the changed dependency software component by receiving a change notification message comprising the information identifying the changed dependency software component.

5. A method for adapting, in a first server computer, application software to a change in a dependency software component, the application software executing on a second server computer, the method comprising:

obtaining by the first server computer a dependency descriptor comprising information identifying a plurality of dependency software components of the application software and, for each of the dependency software components of the plurality of the dependency software components:

a third server computer associated with the dependency software component; and in-use version information identifying an in-use version of the dependency software component that was in use when the application software was last built, wherein each of the dependency software components comprises a software component that the application software uses during execution;

for each of the dependency software components of the plurality of the dependency software components:

obtaining by the first server computer current version information identifying a current version of the dependency software component from the third server computer associated with the dependency software component;

comparing by the first server computer the current version information and the in-use version information to determine whether the current version is more recent than the in-use version; and if the current version is more recent than the in-use version, identifying by the first server computer the dependency software component as a changed dependency software component;

obtaining by the first server computer the changed dependency software component, based on the information identifying the changed dependency software component;

generating by the first server computer rebuilt application software by rebuilding source code of the application software using the changed dependency software component;

determining by the first server computer whether the rebuilt application software was successfully generated;

if the rebuilt application software was not successfully generated, sending by the first server computer a rebuild failure message to a user of the first server computer; and if the rebuilt application software was successfully generated:

testing by the first server computer the rebuilt application software;

determining by the first server computer whether testing of the rebuilt application software was successful;

if the testing of the rebuilt application software was not successful, sending by the first server computer a testing failure message to the user of the first server computer; and if the testing of the rebuilt application software was successful, sending by the first server computer one or more messages configured to cause initiation of execution of the rebuilt application software.

6. The method of claim 5, wherein sending one or more messages to cause initiation of execution of the rebuilt application software comprises:

sending by the first server computer one or more messages to the second server computer, the one or more messages comprising the rebuilt application software and configured to cause the second server computer to initiate execution of the rebuilt application software by:

loading by the second server computer the rebuilt application software;

stopping execution by the second server computer of the application software; and initiating execution by the second server computer of the rebuilt application software.

7. The method of claim 5, wherein the first and second server computers are the same server computer.

8. The method of claim 5, wherein obtaining the current version information of the dependency software component further comprises receiving by the first server computer a change notification message comprising the current version information of the dependency software component.

9. The method of claim 8, wherein, prior to generating the rebuilt application software, the method further comprises:

saving by the first server computer a copy of the dependency descriptor; and updating by the first server computer the dependency descriptor with the current version information of the changed dependency software component.

10. The method of claim 5, wherein the one or more messages are further configured to cause the second server computer to initiate execution by the second server computer of the rebuilt application software at a predetermined time or in response to an identified event.

11. A method for adapting, in a first server computer, application software to a change in a dependency software component, the application software executing on a second server computer, the method comprising:

obtaining by the first server computer information identifying a changed dependency software component, where the changed dependency software component comprises a software component that the application software uses during execution;

obtaining by the first server computer the changed dependency software component, based on the information identifying the changed dependency software component;

entering a first loop for generating rebuilt application software, the first loop comprising:

generating by the first server computer the rebuilt application software by rebuilding source code of the application software using the changed dependency software component;

determining by the first server computer whether the rebuilt application software was successfully generated;

exiting the first loop if the rebuilt application software was successfully generated;

requesting by the first server computer rewritten source code from a user of the first server computer if the rebuilt application software was not successfully generated;

receiving by the first server computer the rewritten source code from the user of the first server computer; and replacing by the first server computer the source code of the application software with the rewritten source code;

entering a second loop for testing the rebuilt application software, the second loop comprising:

testing by the first server computer the rebuilt application software to generate a tested rebuilt application software;

determining by the first server computer whether testing of the rebuilt application software was successful;

exiting the second loop if the testing of the rebuilt application software was successful;

requesting by the first server computer the rewritten source code from the user of the first server computer if the testing of the rebuilt application software was not successful;

receiving by the first server computer the rewritten source code from the user of the first server computer;

replacing by the first server computer the source code of the application software with the rewritten source code; and exiting the second loop and restarting the first loop; and sending by the first server computer one or more messages configured to cause initiation of execution of the tested rebuilt application software.

12. The method of claim 11, wherein sending one or more messages to cause deployment of the rebuilt application software comprises:

sending by the first server computer one or more messages to the second server computer, the one or more messages comprising the rebuilt application software and configured to cause the second server computer to initiate execution of the rebuilt application software by:

loading by the second server computer the rebuilt application software;

stopping execution by the second server computer of the application software; and initiating execution by the second server computer of the rebuilt application software.

13. The method of claim 12, wherein the one or more messages are further configured to cause the second server computer to initiate execution by the second server computer of the rebuilt application software at a predetermined time or in response to an identified event.

14. The method of claim 11, wherein determining whether testing of the rebuilt application software was successful comprises:

sending by the first server computer information relating to results of the testing of the rebuilt application software to the user of the first server computer; and receiving by the first server computer, from the user of the first server computer, information indicating whether testing of the rebuilt application software was successful.

15. The method of claim 11, wherein testing the rebuilt application software comprises:

sending by the first server computer a testing initiation message to a third server computer, the testing initiation message comprising the rebuilt application software and configured to cause the third server computer to perform testing of the rebuilt application software; and receiving by the first server computer from the third server computer a testing results message comprising information indicating whether testing of the rebuilt application software was successful.

16. The method of claim 11, wherein obtaining information identifying the changed dependency software component comprises:

obtaining by the first server computer a dependency descriptor comprising information identifying a plurality of dependency software components of the application software and, for each of the dependency software component of the plurality of the dependency software components:

a third server computer associated with the dependency software component; and in-use version information identifying an in-use version of the dependency software component that was in use when the application software was last built and tested; and for each of the dependency software component of the plurality of the dependency software components:

obtaining by the first server computer current version information identifying a current version of the dependency software component from the third server computer associated with the dependency software component;

comparing by the first server computer the current version information and the in-use version information to determine whether the current version is more recent than the in-use version; and if the current version is more recent than the in-use version, identifying by the first server computer the dependency software component as the changed dependency software component.

17. The method of claim 16, wherein obtaining the current version information of the dependency software component further comprises receiving by the first server computer a change notification message comprising the current version information of the dependency software component.

18. The method of claim 17, wherein, prior to generating the rebuilt application software, the method further comprises:

saving by the first server computer a copy of the dependency descriptor; and updating by the first server computer the dependency descriptor with the current version information of the changed dependency software component.

* * * * *